(12) United States Patent
Farris

(10) Patent No.: US 11,881,098 B1
(45) Date of Patent: Jan. 23, 2024

(54) OBJECT TRACKING ASSEMBLY

(71) Applicant: William Farris, Chicago, IL (US)

(72) Inventor: William Farris, Chicago, IL (US)

(*) Notice: Subject to any disclaimer, the term of this patent is extended or adjusted under 35 U.S.C. 154(b) by 0 days.

(21) Appl. No.: 17/881,698

(22) Filed: Aug. 5, 2022

(51) Int. Cl.
  *G08B 23/00* (2006.01)
  *G08B 21/24* (2006.01)
  *H04W 4/029* (2018.01)

(52) U.S. Cl.
  CPC .......... *G08B 21/24* (2013.01); *H04W 4/029* (2018.02)

(58) Field of Classification Search
  CPC .............................. G08B 21/24; H04W 4/029
  USPC ...................................................... 340/573.4
  See application file for complete search history.

(56) References Cited

U.S. PATENT DOCUMENTS

| 5,939,981 | A  | 8/1999  | Renney |
| 6,501,678 | B1 | 12/2002 | Knaven |
| D476,588  | S  | 7/2003  | Lee |
| 6,956,475 | B1 | 10/2005 | Hill |
| 7,034,684 | B2 | 4/2006  | Boman |
| 7,898,414 | B2 | 3/2011  | Spano |
| 9,196,136 | B2 | 11/2015 | Gutierrez |
| 10,638,404 | B1* | 4/2020 | Chenault ............. H04W 12/082 |
| 10,869,173 | B2* | 12/2020 | Väänänen .......... G08B 21/0227 |
| 11,722,850 | B2* | 8/2023 | Trakinat .................. H04W 4/80 455/456.1 |
| 2012/0214545 | A1* | 8/2012 | Johnson ............. H04M 1/2155 340/539.32 |
| 2012/0218103 | A1* | 8/2012 | Alves ................. G08B 21/0266 340/539.32 |
| 2017/0162029 | A1* | 6/2017 | Hughes .................. G08B 21/24 |
| 2021/0400437 | A1* | 12/2021 | Trakinat .................. H04W 4/80 |

FOREIGN PATENT DOCUMENTS

GB    2507155    4/2014

* cited by examiner

*Primary Examiner* — Tai T Nguyen

(57) ABSTRACT

An object tracking assembly includes a plurality of tracking units that is each attachable to a respective object. Each of the tracking units is in communication with a location network for identifying a location of the tracking units and each of the tracking units broadcasts a tracking signal when the tracking units are actuated. A locating unit is provided and the locating unit broadcasts an actuate signal to each of the tracking units. Each of the tracking units broadcasts the tracking signal to the locating unit when the tracking units receives the actuate signal. The locating unit emits a location alert ranging between a minimum intensity and a maximum intensity corresponding to a distance between the locating unit and a respective one of the tracking units. In this way the locating unit communicates to the user the distance between the locating unit and the respective tracking unit.

7 Claims, 4 Drawing Sheets

OBJECT TRACKING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to tracking devices and more particularly pertains to a new tracking device for identifying the location of a lost object. The device includes a plurality of tracking units that are each attachable to a personal object and a locating unit that is carried by a user. Each of the tracking units is in communication with a global positioning system and the locating unit is in communication with the global positioning system. The locating unit analyzes the distance between the locating unit and a respective tracking unit and subsequently emits an alert of an intensity that corresponds to the distance between the locating unit and the tracking unit. In this way the locating unit can direct the user to locate the object to which the respective tracking unit is attached.

(2) DESCRIPTION OF RELATED ART INCLUDING INFORMATION DISCLOSED UNDER 37 CFR 1.97 AND 1.98

The prior art relates to tracking devices including a locating device that includes a plurality of tracking units that are attachable to a respective object and a hand held device that is in wireless communication with each of the tracking units. The hand held device includes a plurality of buttons that are each assigned to a respective tracking unit and the hand held device emits a tone that increases in intensity as the hand held device approaches the respective tracking unit. The prior art discloses an object locator that includes a plurality of transmitters that are each attachable to a respective object and a hand held device which broadcasts a plurality of signals, each with a distinct frequency assigned to a respective transmitter, such that the respective transmitter responds to the hand held device when the respective transmitter receives the distinct frequency. The prior art discloses an object locator that includes a base unit and a plurality of tracking units that are each attachable to a respective personal object. The base unit has a knob that is positionable in a plurality of positions that correspond to a respective tracking unit such that the respective tracking unit emits an audible sound for locating the respective personal object. The prior art discloses an object monitoring system that includes a monitor and a plurality of radio identification tags that are each attached to a respective personal item. The monitor emits an alert when any of the radio tags moves beyond a pre-determined distance of the monitor.

BRIEF SUMMARY OF THE INVENTION

An embodiment of the disclosure meets the needs presented above by generally comprising a plurality of tracking units that is each attachable to a respective object. Each of the tracking units is in communication with a location network for identifying a location of the tracking units and each of the tracking units broadcasts a tracking signal when the tracking units are actuated. A locating unit is provided and the locating unit broadcasts an actuate signal to each of the tracking units. Each of the tracking units broadcasts the tracking signal to the locating unit when the tracking units receives the actuate signal. The locating unit emits a location alert ranging between a minimum intensity and a maximum intensity corresponding to a distance between the locating unit and a respective one of the tracking units. In this way the locating unit communicates to the user the distance between the locating unit and the respective tracking unit.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
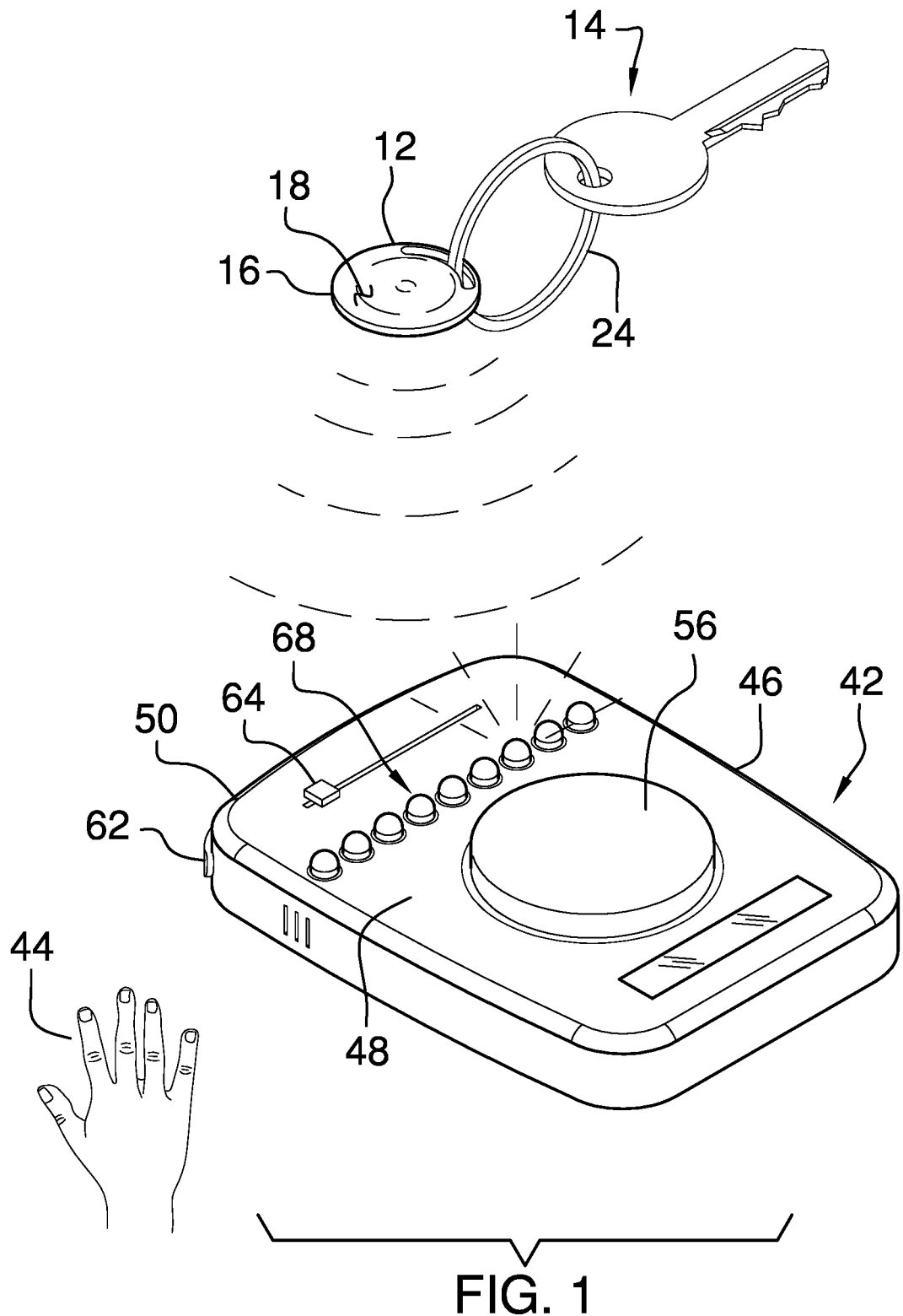
FIG. 1 is a perspective view of an object tracking assembly according to an embodiment of the disclosure.
Figure 2:
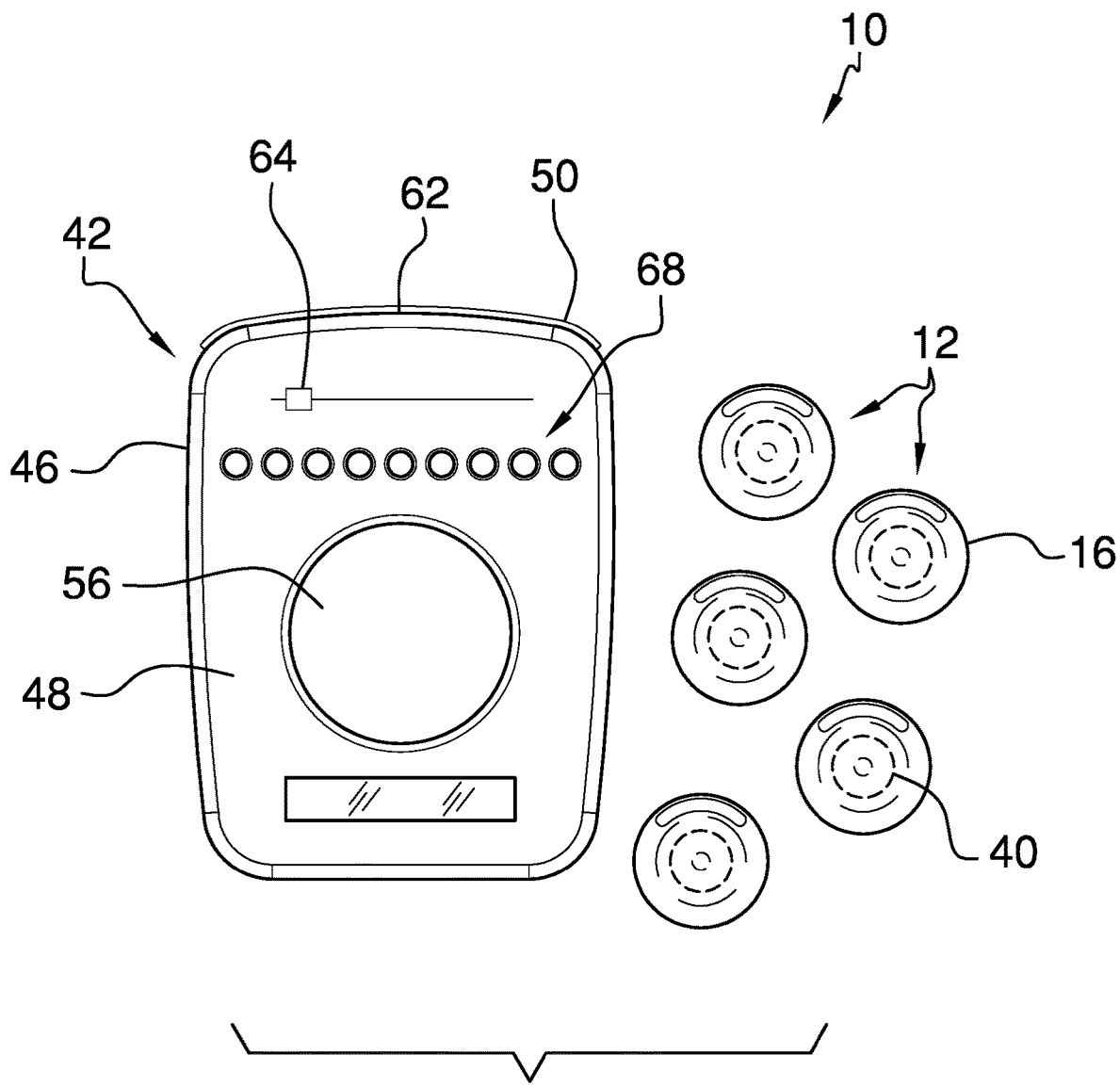
FIG. 2 is a top view of an embodiment of the disclosure.
Figure 3:
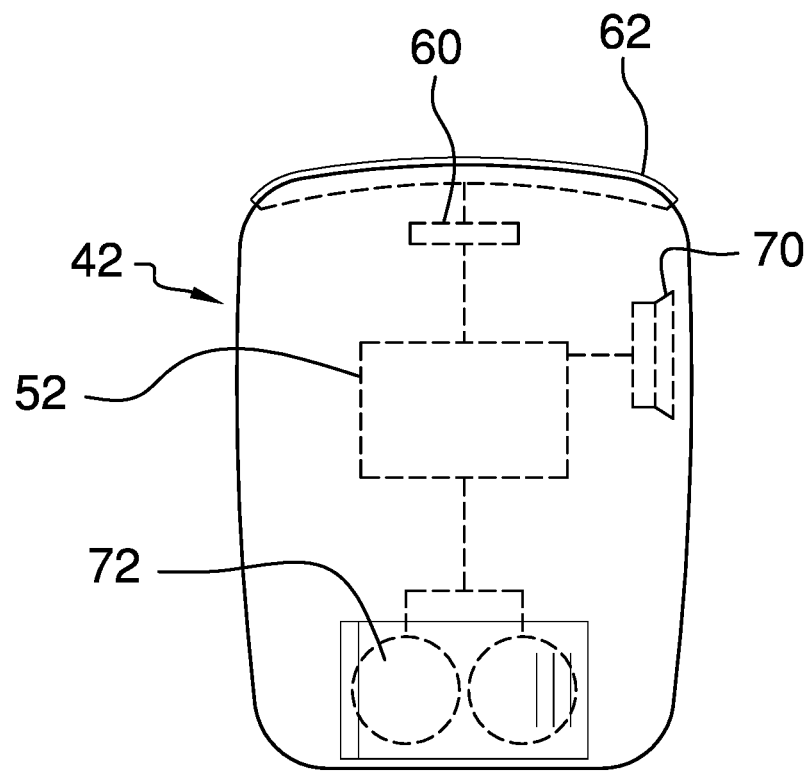
FIG. 3 is a bottom phantom view of a locating unit of an embodiment of the disclosure.
Figure 4:
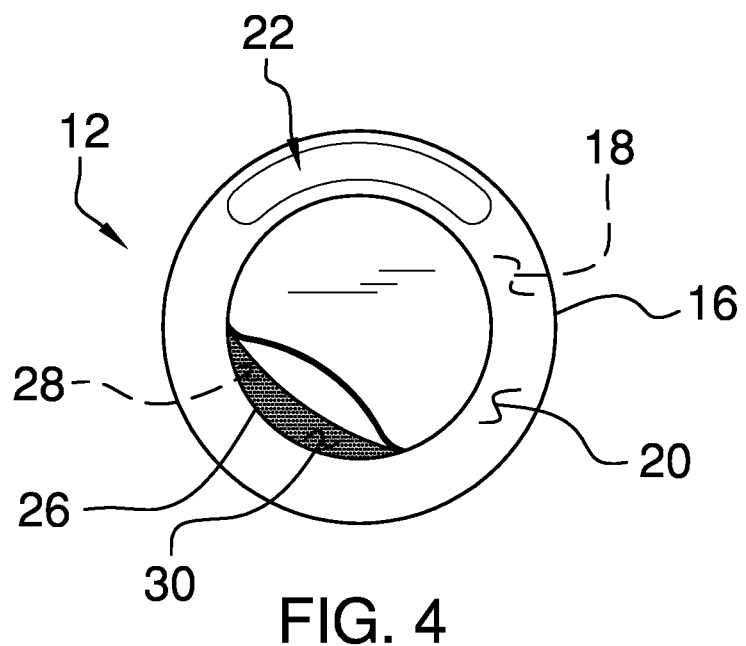
FIG. 4 is a bottom view of a tracking unit of an embodiment of the disclosure.
Figure 5:
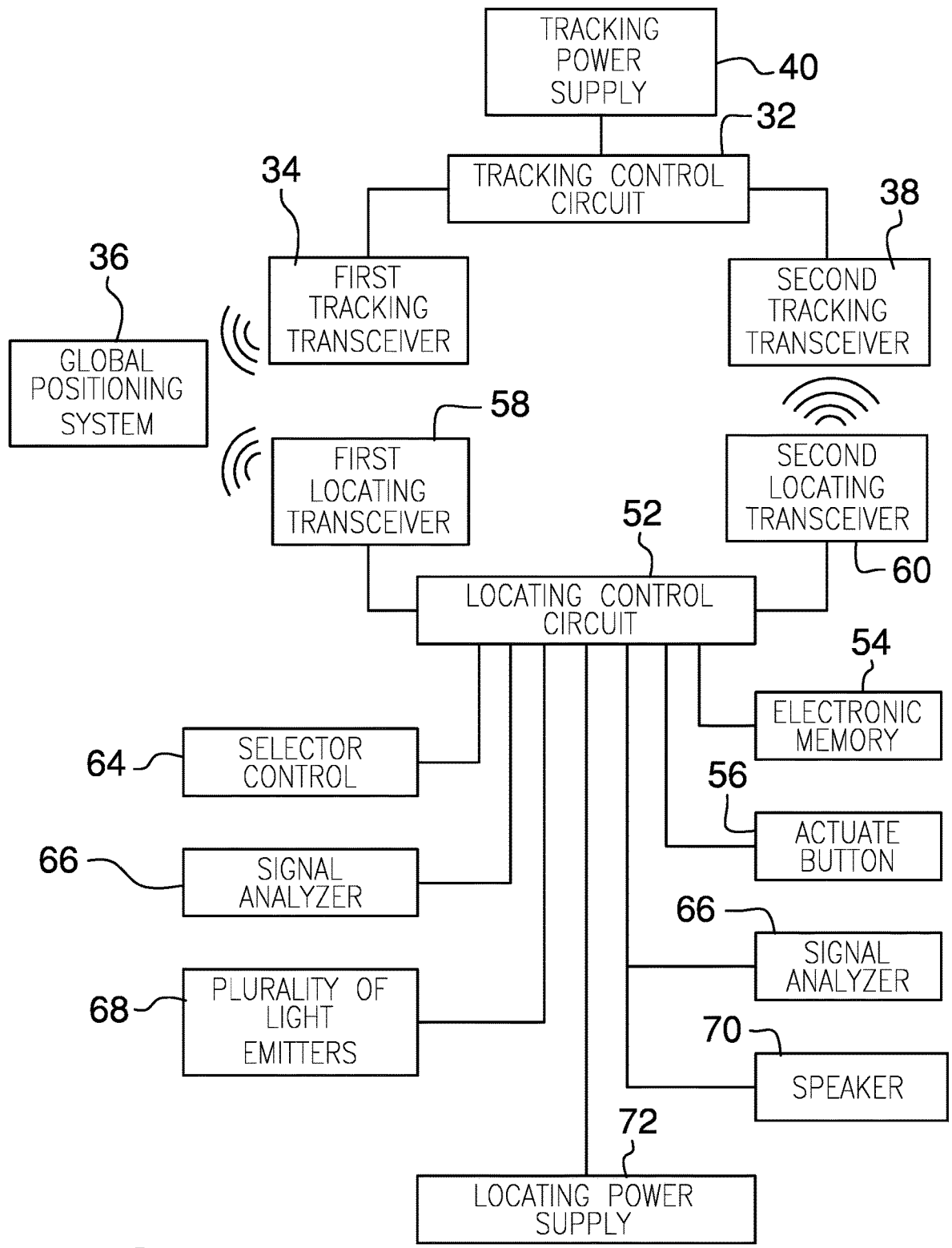
FIG. 5 is a schematic view of an embodiment of the disclosure.

With reference now to the drawings, and in particular to FIGS. 1 through 5 thereof, a new tracking device embodying the principles and concepts of an embodiment of the disclosure and generally designated by the reference numeral 10 will be described.

As best illustrated in FIGS. 1 through 5, the object tracking assembly 10 generally comprises a plurality of tracking units 12 that is each attachable to a respective object 14. The respective object 14 may be any personal object that is commonly misplaced, including but not being limited to car keys and eyeglasses. Furthermore, the respective object 14 may be a golf ball and a respective one of the tracking units 12 may be embedded within the golf ball. Each of the tracking units 12 is in communication with a location network for identifying a location of the tracking units 12. Each of the tracking units 12 broadcasts a tracking signal when the tracking units 12 are actuated and each of the tracking units 12 is assigned a unique identity with respect to each other.

Each of the tracking units 12 comprises a disk 16 that has a top surface 18 and a bottom surface 20, and the disk 16 has a slot 22 extending through the top surface 18 and the bottom surface 20 thereby facilitating a key ring 24 to be extended through the slot 22 for attaching the disk 16 to a set of keys. Each of the tracking units 12 includes an adhesive layer 26 that has a first surface 28 and a second surface 30, and the first surface 28 is bonded to the bottom surface 20. Each of the tracking units 12 includes a protective sheet 32 that is removably is bonded to the second surface 30 of the adhesive layer 26 for inhibiting the second surface 30 from adhering to an object. Additionally, the second surface 30 is adhereable to the surface when the protective sheet is removed from the second surface.

Each of the tracking units 12 includes a tracking control circuit 32 that is integrated into the disk 16 and the tracking control circuit 32 receives an actuate input. The tracking control circuit 32 corresponding to each of the tracking units 12 is assigned a unique identity with respect to each other. Each of the tracking units 12 includes a first tracking transceiver 34 that is integrated into the disk 16 and the first tracking transceiver 34 is electrically coupled to the tracking control circuit 32. The first tracking transceiver 34 is in wireless communication with a global positioning system 36 thereby facilitating the first tracking transceiver 34 to establish a physical location of the disk 16. The first tracking transceiver 34 is actuated when the tracking control circuit 32 receives the actuate input and the first tracking transceiver 34 may comprise a radio frequency transceiver or the like.

Each of the tracking units 12 includes a second tracking transceiver 38 that is integrated into the disk 16 and the second tracking transceiver 38 is electrically coupled to the tracking control circuit 32. The second tracking transceiver 38 broadcasts the tracking signal when the tracking control circuit 32 receives the actuate input and the tracking signal includes the physical location of the disk 16 established by the first tracking transceiver 34. The second tracking transceiver 38 may comprise a radio frequency transceiver or the like and the second tracking transceiver 38 may have an operational range of at least 1000.0 meters. Each of the tracking units 12 includes a tracking power supply 40 that is integrated into the disk 16. The tracking power supply 40 is electrically coupled to the tracking control circuit 32 and the tracking power supply 40 comprises at least one battery.

A locating unit 42 is provided that is carried by a user 44 and the locating unit 42 broadcasts an actuate signal to each of the tracking units 12 when the locating unit 42 is actuated. Each of the tracking units 12 broadcasts the tracking signal to the locating unit 42 when the tracking units 12 receives the actuate signal. The locating unit 42 emits a location alert ranging between a minimum intensity and a maximum intensity. The intensity of the location alert corresponds to a distance between the locating unit 42 and a respective one of the tracking units 12. In this way the locating unit 42 can communicate to the user 44 the distance between the locating unit 42 and the respective tracking unit.

The locating unit 42 comprises a housing 46 that has a top wall 48 and a front wall 50. The locating unit 42 includes a locating control circuit 52 that is integrated into the housing 46 and the locating control circuit 52 receives a tracking input. The locating control circuit 52 includes an electronic memory 54 which stores the unique identities of each of the tracking control circuit 32 associated with each of the tracking units 12. The locating unit 42 includes an actuate button 56 that is movably integrated into the top wall 48 of the housing 46. The actuate button 56 is electrically coupled to the locating control circuit 52 and the locating control circuit 52 receives the tracking input when the actuate button 56 is depressed.

The locating unit 42 includes a first locating transceiver 58 that is integrated into the housing 46 and the first locating transceiver 58 is electrically coupled to the locating control circuit 52. The first locating transceiver 58 is in wireless communication with the global positioning system 36 thereby facilitating the first locating transceiver 58 to establish a physical location of the locating unit 42. The first locating transceiver 58 may comprise a radio frequency transceiver or the like. The locating unit 42 includes a second locating transceiver 60 that is integrated into the housing 46 and the second locating transceiver 60 is electrically coupled to the locating control circuit 52. The second locating transceiver 60 is in wireless communication with the second tracking transceiver 38 associated with each of the tracking units 12. Furthermore, the second locating transceiver 60 broadcasts an actuate signal when the locating control circuit 52 receives the tracking input. The second locating transceiver 60 may comprise a radio frequency transceiver or the like and the second locating transceiver 60 may have an operational range of at least 1000.0 meters.

The locating unit 42 includes an antenna 62 that is coupled to the front wall 50 of the housing 46. The antenna 62 is electrically coupled to each of the first locating transceiver 58 and the second locating transceiver 60 thereby facilitating each of the first locating transceiver 58 and the second locating transceiver 60 to send and receive a signal. The locating unit 42 includes a selector control 64 that is movably integrated into the top wall 48 of the housing 46 and the selector control 64 is electrically coupled to the locating control circuit 52. The selector control 64 is positionable in a variety of positions that is each assigned to the unique identity of a respective one of the tracking units 12 to define an actuated tracking unit 12.

The second locating transceiver 60 broadcasts the actuate signal to the second tracking transceiver 38 associated with the actuated tracking unit 12. Furthermore, the tracking control circuit 32 associated with the actuated tracking unit 12 receives the actuate input when the second tracking transceiver 38 associated with the actuated tracking unit 12 receives the actuate signal. The locating unit 42 includes a signal analyzer 66 that is integrated into the housing 46 and the signal analyzer 66 is electrically coupled to the locating control circuit 52. The signal analyzer 66 compares the physical location of the locating unit 42 with the physical location of the actuated tracking unit 12.

The locating unit 42 includes a plurality of light emitters 68 that is each coupled to the top wall 48 of the housing 46 and each of the light emitters 68 is electrically coupled to the locating control circuit 52. The plurality of light emitters 68 is spaced apart from each other and laterally distributed along the top wall 48. The plurality of light emitters 68 is sequentially illuminated to correspond to a distance between the locating unit 42 and the actuated tracking unit 12 to visually communicate to the user 44 the distance between the locating unit 42 and the actuated tracking unit 12. Each of the plurality of light emitters 68 may comprise a light emitting diode or other type of electronic light emitter and each of the light emitters 68 may include a lens.

The locating unit 42 includes a speaker 70 that is integrated into the housing 46 and the speaker 70 is electrically coupled to the locating control circuit 52. The speaker is actuated to emit an audible alert ranging between a minimum volume and a maximum volume to correspond with the distance between the locating unit 42 and the actuated tracking unit 12. In this way the speaker 70 can audibly communicate to the user 44 the distance between the locating unit 42 and the actuated tracking unit 12. The speaker 70 may comprise an electronic speaker or the like. The locating unit 42 includes a locating power supply 72 that is integrated into the housing 46, the locating power supply 72 is electrically coupled to the locating control circuit 52 and the locating power supply 72 comprises at least one battery.

In use, each of the tracking units 12 is attached to the respective object 14 and the selector control 64 is positioned in the position that corresponds to the identity of the tracking unit 12 associated with the object 14 that has been lost or misplaced. The actuate button 56 is depressed such that the tracking unit 12 associated with the object 14 that has been lost or misplaced broadcasts the physical location of the object 14 to the locating unit 42. A number of the light emitters 68 are turned on to communicate to the user 44 the distance between the locating unit 42 and the object 14. Furthermore, the speaker 70 emits the audible alert at a volume that corresponds to the distance between the locating unit 42 and the object 14. More of the light emitters 68 are turned on as the user 44 moves closer to the object 14 and the volume of the speaker 70 increases as the user 44 moves closer to the object 14. In this way the user 44 can be guided to the object 14 thereby facilitating the user 44 to locate the object 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An object tracking assembly for employing global positioning system data to locate lost objects, said assembly comprising:
   a plurality of tracking units, each of said tracking units being attachable to a respective object, each of said tracking units being in communication with a location network for identifying a location of said tracking units, each of said tracking units broadcasting a tracking signal when said tracking units are actuated, each of said tracking units being assigned a unique identity with respect to each other;
   a locating unit being carried by a user, said locating unit broadcasting an actuate signal to each of said tracking units when said locating unit is actuated, each of said tracking units broadcasting said tracking signal to said locating unit when said tracking units receives said actuate signal, said locating unit emitting a location alert ranging between a minimum intensity and a maximum intensity, said intensity of said location alert corresponding to a distance between said locating unit and a respective one of said tracking units wherein said locating unit is configured to communicate to the user the distance between said locating unit and said respective tracking unit; and
   wherein each of said tracking units comprises:
      a disk having a top surface and a bottom surface, said disk having a slot extending through said top surface and said bottom surface thereby facilitating a key ring to be extended through said slot for attaching said disk to a set of keys;
      an adhesive layer having a first surface and a second surface, said first surface being bonded to said bottom surface;
      a protective sheet being removably being bonded to said second surface of said adhesive layer for inhibiting said second surface from adhering to a surface, said second surface being adhereable to the surface when said protective sheet is removed from said second surface;
      a tracking control circuit being integrated into said disk, said tracking control circuit receiving an actuate input, said tracking control circuit corresponding to each of said tracking units being assigned a unique identity with respect to each other;
      a first tracking transceiver being integrated into said disk, said first tracking transceiver being electrically coupled to said tracking control circuit, said first tracking transceiver being in wireless communication with a global positioning system thereby facilitating said first tracking transceiver to establish a physical location of said disk, said first tracking transceiver being actuated when said tracking control circuit receives said actuate input;
      a second tracking transceiver being integrated into said disk, said second tracking transceiver being electrically coupled to said tracking control circuit, said second tracking transceiver broadcasting said tracking signal when said tracking control circuit receives said actuate input, said tracking signal including the physical location of said disk established by said first tracking transceiver; and
      a tracking power supply being integrated into said disk, said tracking power supply being electrically coupled to said tracking control circuit, said tracking power supply comprising at least one battery.

2. The assembly according to claim 1, wherein said locating unit comprises:

a housing having a top wall and a front wall;
a locating control circuit being integrated into said housing, said locating control circuit receiving a tracking input, said locating control circuit including an electronic memory storing said unique identities of each of said tracking control circuit associated with each of said tracking units;
an actuate button being movably integrated into said top wall of said housing, said actuate button being electrically coupled to said locating control circuit, said locating control circuit receiving said tracking input when said actuate button is depressed;
a first locating transceiver being integrated into said housing, said first locating transceiver being electrically coupled to said locating control circuit, said first locating transceiver being in wireless communication with the global positioning system thereby facilitating said first locating transceiver to establish a physical location of said locating unit;
a second locating transceiver being integrated into said housing, said second locating transceiver being electrically coupled to said locating control circuit, said second locating transceiver being in wireless communication with said second tracking transceiver associated with each of said tracking units, said second locating transceiver broadcasting an actuate signal when said locating control circuit receives said tracking input; and
an antenna being coupled to said front wall of said housing, said antenna being electrically coupled to each of said first locating transceiver and said second locating transceiver thereby facilitating each of said first locating transceiver and said second locating transceiver to send and receive a signal.

3. The assembly according to claim 2, wherein said locating unit includes a selector control being movably integrated into said top wall of said housing, said selector control being electrically coupled to said locating control circuit, said selector control being positionable in a variety of positions each being assigned to said unique identity of a respective one of said tracking units to define an actuated tracking unit, said second locating transceiver broadcasting said actuate signal to said second tracking transceiver associated with said actuated tracking unit, said tracking control circuit associated with said actuated tracking unit receiving said actuate input when said second tracking transceiver associated with said actuated tracking unit receives said actuate signal.

4. The assembly according to claim 2, wherein said locating unit includes a signal analyzer being integrated into said housing, said signal analyzer being electrically coupled to said locating control circuit, said signal analyzer comparing said physical location of said locating unit with said physical location of said actuated tracking un it.

5. The assembly according to claim 3, Wherein said locating unit includes a plurality of light emitters, each of said light emitters being coupled to said top wall of said housing, each of said light emitters being electrically coupled to said locating control circuit, said plurality of light emitters being spaced apart from each other and being laterally distributed along said top wall, said plurality of light emitters being sequentially illuminated to correspond to a distance between said locating unit and said actuated tracking unit wherein said plurality of light emitters is configured to visually communicate to the user the distance between said locating unit and said actuated tracking unit.

6. The assembly according to claim 3, wherein said locating unit includes a speaker being integrated into said housing, said speaker being electrically coupled to said locating control circuit, said speaker being actuated to emit an audible alert ranging between a minimum volume and a maximum volume to correspond with the distance between said locating unit and said tracking unit wherein said speaker is configured to audibly communicate to the user the distance between said locating unit and said actuated tracking unit.

7. An object tracking assembly for employing global positioning system data to locate lost objects, said assembly comprising:
a plurality of tracking units, each of said tracking units being attachable to a respective object, each of said tracking units being in communication with a location network for identifying a location of said tracking units, each of said tracking units broadcasting a tracking signal when said tracking units are actuated, each of said tracking units being assigned a unique identity with respect to each other, each of said tracking units comprising:
a disk having a top surface and a bottom surface, said disk having a slot extending through said top surface and said bottom surface thereby facilitating a key ring to be extended through said slot for attaching said disk to a set of keys;
an adhesive layer having a first surface and a second surface, said first surface being bonded to said bottom surface;
a protective sheet being removably being bonded to said second surface of said adhesive layer for inhibiting said second surface from adhering to a surface, said second surface being adherable to the surface when said protective sheet is removed from said second surface;
a tracking control circuit being integrated into said disk, said tracking control circuit receiving an actuate input, said tracking control circuit corresponding to each of said tracking units being assigned a unique identity with respect to each other;
a first tracking transceiver being integrated into said disk, said first tracking transceiver being electrically coupled to said tracking control circuit, said first tracking transceiver being in wireless communication with a global positioning system thereby facilitating said first tracking transceiver to establish a physical location of said disk, said first tracking transceiver being actuated when said tracking control circuit receives said actuate input;
a second tracking transceiver being integrated into said disk, said second tracking transceiver being electrically coupled to said tracking control circuit, said second tracking transceiver broadcasting said tracking signal when said tracking control circuit receives said actuate input, said tracking signal including the physical location of said disk established by said first tracking transceiver; and
a tracking power supply being integrated into said disk, said tracking power supply being electrically coupled to said tracking control circuit, said tracking power supply comprising at least one battery;
a locating unit being carried by a user, said locating unit broadcasting an actuate signal to each of said tracking units when said locating unit is actuated, each of said tracking units broadcasting said tracking signal to said locating unit when said tracking units receives said actuate signal, said locating unit emitting a location alert ranging between a minimum intensity and a maximum intensity, said intensity of said location alert corresponding to a distance between said locating unit and a respective one of said tracking units wherein said locating unit is configured to communicate to the user the distance between said locating unit and said respective tracking unit, said locating unit comprising:

a housing having a top wall and a front wall;

a locating control circuit being integrated into said housing, said locating control circuit receiving a tracking input, said locating control circuit including an electronic memory storing said unique identities of each of said tracking control circuit associated with each of said tracking units;

an actuate button being movably integrated into said top wall of said housing, said actuate button being electrically coupled to said locating control circuit, said locating control circuit receiving said tracking input when said actuate button is depressed;

a first locating transceiver being integrated into said housing, said first locating transceiver being electrically coupled to said locating control circuit, said first locating transceiver being in wireless communication with the global positioning system thereby facilitating said first locating transceiver to establish a physical location of said locating unit;

a second locating transceiver being integrated into said housing, said second locating transceiver being electrically coupled to said locating control circuit, said second locating transceiver being in wireless communication with said second tracking transceiver associated with each of said tracking units, said second locating transceiver broadcasting an actuate signal when said locating control circuit receives said tracking input;

an antenna being coupled to said front wall of said housing, said antenna being electrically coupled to each of said first locating transceiver and said second locating transceiver thereby facilitating each of said first locating transceiver and said second locating transceiver to send and receive a signal;

a selector control being movably integrated into said top wall of said housing, said selector control being electrically coupled to said locating control circuit, said selector control being positionable in a variety of positions each being assigned to said unique identity of a respective one of said tracking units to define an actuated tracking unit, said second locating transceiver broadcasting said actuate signal to said second tracking transceiver associated with said actuated tracking unit, said tracking control circuit associated with said actuated tracking unit receiving said actuate input when said second tracking transceiver associated with said actuated tracking unit receives said actuate signal;

a signal analyzer being integrated into said housing, said signal analyzer being electrically coupled to said locating control circuit, said signal analyzer comparing said physical location of said locating unit with said physical location of said actuated tracking unit;

a plurality of light emitters, each of said light emitters being coupled to said top wall of said housing, each of said light emitters being electrically coupled to said locating control circuit, said plurality of light emitters being spaced apart from each other and being laterally distributed along said top wall, said plurality of light emitters being sequentially illuminated to correspond to a distance between said locating unit and said actuated tracking unit Wherein said plurality of tight emitters is configured to visually communicate to the user the distance between said locating unit and said actuated tracking unit;

a speaker being integrated into said housing, said speaker being electrically coupled to said locating control circuit, said speaker being actuated to emit an audible alert ranging between a minimum volume and a maximum volume to correspond with the distance between said locating unit and said tracking unit wherein said speaker is configured to audibly communicate to the user the distance between said locating unit and said actuated tracking unit; and a locating power supply being integrated into said housing, said locating power supply being electrically coupled to said locating control circuit, said locating power supply comprising at least one battery.

* * * * *